United States Patent [19]

Iwashita

[11] Patent Number: 5,233,282
[45] Date of Patent: Aug. 3, 1993

[54] BATTERY SYSTEM FOR MARINE PROPULSION UNIT

[75] Inventor: Takashi Iwashita, Hamamatsu, Japan

[73] Assignee: Sanshin Kogyo Kabushiki Kaisha, Hamamatsu, Japan

[21] Appl. No.: 832,444

[22] Filed: Feb. 7, 1992

[30] Foreign Application Priority Data

Feb. 8, 1991 [JP] Japan .................. 3-039073

[51] Int. Cl.$^5$ ........................... H02J 7/00
[52] U.S. Cl. ........................... 320/7; 320/15; 320/16
[58] Field of Search .................. 320/7, 15, 16

[56] References Cited

U.S. PATENT DOCUMENTS

| | | | |
|---|---|---|---|
| 2,344,568 | 3/1944 | Snyder | 320/7 |
| 3,090,871 | 5/1963 | Gorman | 320/15 |
| 3,510,745 | 5/1970 | Futterer | 320/7 |
| 3,718,848 | 2/1973 | Hines | 320/7 |
| 3,917,017 | 11/1975 | Deane | 320/8 |
| 4,042,056 | 8/1977 | Horwinski | 180/65 A |
| 4,081,738 | 3/1978 | Roller | 320/7 |
| 4,139,812 | 2/1979 | Huggins | 320/7 |
| 4,351,405 | 9/1982 | Fields et al. | 180/65 A |
| 4,413,220 | 11/1983 | Waineo | 320/15 |
| 4,438,342 | 3/1984 | Kenyon | 290/45 |
| 4,470,476 | 9/1984 | Hunt | 180/65.2 |
| 5,111,132 | 5/1992 | Motose | 322/90 |
| 5,164,655 | 11/1992 | Heavey | 322/8 |

*Primary Examiner*—Emanuel T. Voeltz
*Assistant Examiner*—Thomas M. Dougherty
*Attorney, Agent, or Firm*—Ernest A. Beutler

[57] ABSTRACT

A battery system for use in connection with a pair of marine propulsion units, one of which is powered by an internal combustion engine that drives a generator and the other of which is actuated by an electric motor. A pair of actuating batteries are in circuit with the electric motor and the generator and are adapted to selectively provide power to the electric motor or receive a charge from the generator in response to a main switch which is also used to control the starting of the internal combustion engine. A pair of contact relays, responsive to the main switch, are used to adjust the circuitry of the battery system so that the actuating batteries are either connected in parallel in the charging state or connected in series in the actuating state.

2 Claims, 1 Drawing Sheet

BATTERY SYSTEM FOR MARINE PROPULSION UNIT

BACKGROUND OF THE INVENTION

This invention relates to a battery system adapted for use with a marine propulsion system, and more particularly to an improved arrangement for selectively charging and drawing power from two or more batteries.

In many applications a battery is employed for powering electrical devices and this battery is charged by a generator driven by an internal combustion engine. A wide variety of vehicles including marine vessels incorporate such systems.

One type of system is employed on a marine vessel which has a pair of marine propulsion units, a main unit which is powered by an internal combustion engine and a second unit which includes an electric motor that derives its power from one or two 12 volt actuating batteries which may be connected in series by a manual switch. The switch may also be used to change the circuitry so that the batteries are charged by the generator which is driven by the internal combustion engine during operation of the main propulsion unit.

While this type of battery system has certain advantages, it has certain disadvantages as well. For example, it has also been the practice in such a conventional charging system to employ a separate starting mechanism in circuit with a starting battery for starting the internal combustion engine. This starting mechanism has been employed in addition to the manual switch which has been used to change the battery circuitry between an operating and charging state and which has been incorporated into the circuitry so that it functions independently of the starting mechanism.

When the manual switch for the actuating batteries of the electric motor is operated separately from the mechanism for starting the internal combustion engine, there is a distinct possibility that during operation of the internal combustion engine the switch will not be properly set and hence the electric motor batteries will not be charged. Having a separate switch and starting mechanism also adds to the complexity and cost of the system.

It is, therefore, a principal object of this invention to provide an improved system for selectively charging and using a plurality of batteries.

It is a further object of this invention to provide an improved system for selectively charging and using a plurality of batteries in a propulsion unit arrangement having an internal combustion engine, a generator for charging the batteries and an electric motor that derives power from the batteries which system includes a single switch for controlling the state of the batteries and for starting the internal combustion engine.

SUMMARY OF THE INVENTION

This invention is adapted to be embodied in a battery system comprising a first propulsion unit having an internal combustion engine and a generator driven by the engine, a plurality of actuating batteries and a second propulsion unit having an electric motor operated by the actuating batteries. Relay means are provided for selectively connecting the actuating batteries in parallel for charging them from the generator and connecting the actuating batteries in series for operating the electric motor. In accordance with the invention, there is a switch for controlling the relay means and for controlling the starting of the internal combustion engine.

DETAILED DESCRIPTION OF THE PREFERRED EMBODIMENT OF THE INVENTION

Figure 1:
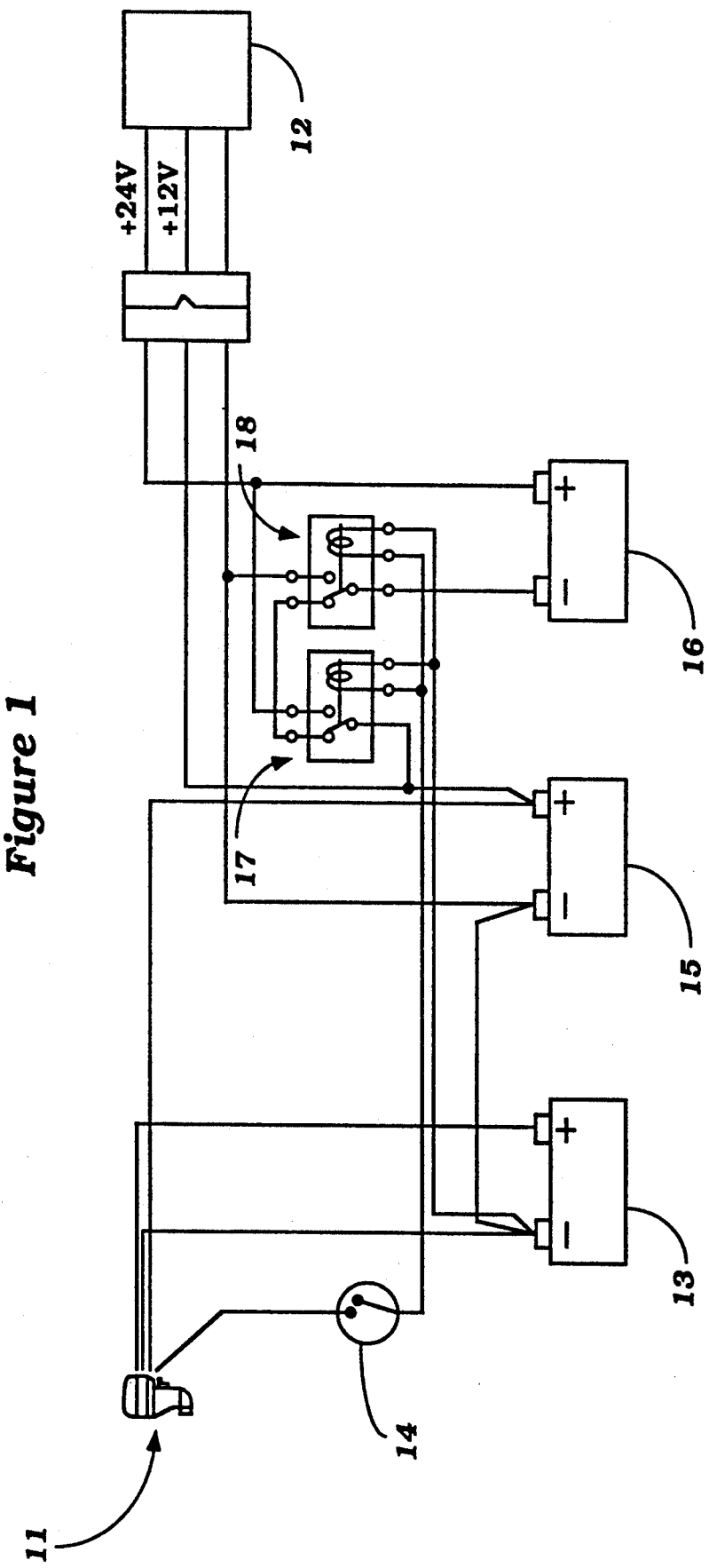
FIG. 1 is a side elevational view of a marine propulsion unit in connection with a schematic diagram of the circuitry of the battery system in accordance with an embodiment of the invention.

Referring to the single drawing FIGURE, a main marine propulsion unit identified generally by the reference numeral 11 and a second marine propulsion unit identified by the reference numeral 12 are depicted in connection with a battery system. The main marine propulsion unit 11 is powered by a conventional internal combustion engine and includes a conventional generator that is driven by the engine in a known manner. The second marine propulsion unit is actuated by an electric motor rated at 12 and 24 volts.

A starting battery 13 is in circuit with the generator for drawing a charge during operation of the internal combustion engine. The starting battery 13 is also in circuit with the starter motor of the internal combustion engine and a main ignition switch 14 which is used to selectively open and close that circuit. The switch 14, which is shown in the "off" position in the drawing FIGURE, is moved to the "on" position wherein the circuit between the starter motor and battery 13 is closed to start the engine.

A pair of actuating batteries 15 and 16 are provided in circuit with the electric motor and also in circuit with the generator for selectively actuating the electric motor or receiving a charge from the generator. To this end, there are provided a pair of three-contact relays 17 and 18 which are connected with the batteries 15 and 16 and which each include a solenoid winding and an armature type element. The three-contact relay switches 17 and 18 are operated in connection with the main switch 14.

When the main switch 14 is turned on, the solenoid windings are energized to move the armature type elements to the right as seen from the drawing FIGURE so as to connect the batteries 15 and 16 in parallel to the generator. When the batteries are connected in this manner they will be charged by the generator during operation of the internal combustion engine. When the main switch 14 is turned off to shut off the internal combustion engine, the solenoid windings are deenergized so that the relays 17 and 18 are in the position shown in the drawing FIGURE. Thus, when the main ignition switch 14 is off, the batteries 15 and 16 are connected in series through a connector to the 24 volt rating terminal of the electric motor for actuating the motor so as to operate the second marine propulsion unit 12.

The battery 15 is also connected to the 12 volt rating terminal of the electric motor through the connector for operation of the motor on only 12 volts.

It should be readily apparent from the foregoing description that a very effective battery system in connection with an internal combustion engine and electric motor is provided for selectively charging and using a plurality of batteries to actuate the motor wherein the batteries will be automatically charged during operation of the internal combustion engine. Although an embodiment of the invention has been illustrated and described, various changes and modifications may be made without departing from the spirit and scope of the invention, as defined by the appended claims.

I claim:

1. A battery system comprising a first propulsion unit having an internal combustion engine and a generator driven by the engine, a starting battery in circuit with the engine for starting the engine, a plurality of actuating batteries, a second propulsion unit having an electric motor operated by said actuating batteries, and relay means for selectively connecting said actuating batteries in parallel for charging said actuating batteries from said generator and connecting said actuating batteries in series for operating the electric motor, and a switch for controlling said relay means and for controlling the starting of the internal combustion engine.

2. A battery system as recited in claim 1, wherein said switch is moveable between a first and a second position such that when said switch is in the first position said actuating batteries are connected in parallel and when said switch is in the second position said actuating batteries are connected in series.

* * * * *